United States Patent
Higgs (10) Patent No.: US 10,142,462 B2
(45) Date of Patent: *Nov. 27, 2018

(54) CONTROLLED-ENVIRONMENT FACILITY RESIDENT COMMUNICATION DETECTION

(71) Applicant: Securus Technologies, Inc., Dallas, TX (US)

(72) Inventor: Joseph Higgs, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,359

(22) Filed: Mar. 14, 2017

(65) Prior Publication Data

US 2017/0187869 A1    Jun. 29, 2017

Related U.S. Application Data

(63) Continuation of application No. 15/082,418, filed on Mar. 28, 2016, now Pat. No. 9,596,343, which is a continuation of application No. 14/567,894, filed on Dec. 11, 2014, now Pat. No. 9,300,791.

(51) Int. Cl.
| | |
|---|---|
| *H04M 1/56* | (2006.01) |
| *H04M 15/06* | (2006.01) |
| *H04M 11/00* | (2006.01) |
| *H04M 3/42* | (2006.01) |
| *H04M 3/22* | (2006.01) |
| *H04M 3/20* | (2006.01) |

(52) U.S. Cl.
CPC ......... *H04M 3/2281* (2013.01); *H04M 3/205* (2013.01); *H04M 3/2218* (2013.01); *H04M 3/42348* (2013.01)

(58) Field of Classification Search
CPC .... H04M 11/062; H04M 1/663; H04M 1/665; H04M 3/2281; H04M 19/02; H04M 2201/40; H04M 3/36; H04M 3/38
USPC ......... 379/32.01, 93.01, 93.02, 93.03, 93.04, 379/93.21, 93.23, 93.34, 100.05, 207.01, 379/207.11, 207.21, 207.13, 207.15, 379/210.02
See application file for complete search history.

(56) References Cited

U.S. PATENT DOCUMENTS

| | | | |
|---|---|---|---|
| 5,907,602 | A | 5/1999 | Peel |
| 5,926,533 | A | 7/1999 | Gainsboro |
| 7,248,685 | B2 | 7/2007 | Martin |
| 7,826,604 | B2 | 11/2010 | Martin |

(Continued)

*Primary Examiner* — Binh Kien Tieu
(74) *Attorney, Agent, or Firm* — Fogarty LLP (57) ABSTRACT

Systems and methods insert a modulated signal into audio of a controlled-environment facility resident's side of a call, such as by a controlled-environment communication apparatus, or the like. The same or a different controlled-environment communication apparatus, or the like, may detect the same and/or another modulated signal inserted into the audio of the same and/or another controlled-environment facility resident's side of the call in the audio of an other party's side of the call. The same or a different controlled-environment communication apparatus, or the like, may determine if more than one modulated signal is present in the other call party's side of the call and alert an authority that more than one controlled-environment facility resident is taking part in the call.

22 Claims, 3 Drawing Sheets

(56) References Cited

U.S. PATENT DOCUMENTS

| | | | |
|---|---|---|---|
| 7,826,837 B1* | 11/2010 | Sylvester | H04W 24/06 |
| | | | 455/423 |
| 8,275,102 B2 | 9/2012 | Zheng | |
| 8,731,934 B2 | 5/2014 | Olligschlaeger et al. | |
| 8,942,356 B2 | 1/2015 | Olligschlaeger | |
| 9,300,791 B1 | 3/2016 | Higgs | |
| 9,460,262 B2* | 10/2016 | Kaufman | G06F 19/3418 |
| 9,596,343 B2 | 3/2017 | Higgs | |
| 2001/0036821 A1 | 11/2001 | Gainsboro et al. | |
| 2003/0061002 A1* | 3/2003 | Steinbrecher | G01S 11/16 |
| | | | 702/159 |
| 2005/0058267 A1 | 3/2005 | Martin | |
| 2007/0071206 A1 | 3/2007 | Gainsboro et al. | |
| 2007/0269033 A1 | 11/2007 | Martin | |
| 2009/0067604 A1 | 3/2009 | Apple et al. | |
| 2009/0207987 A1 | 8/2009 | Ryan | |
| 2010/0316205 A1 | 12/2010 | Zheng et al. | |
| 2011/0036821 A1 | 2/2011 | Ruehrnoessl et al. | |
| 2011/0096139 A1* | 4/2011 | Rudolf | H04N 7/142 |
| | | | 348/14.11 |
| 2015/0201072 A1 | 7/2015 | Rokosky | |

* cited by examiner

CONTROLLED-ENVIRONMENT FACILITY RESIDENT COMMUNICATION DETECTION

CROSS-REFERENCE TO RELATED APPLICATION

This is a continuation of, and claims benefit of, U.S. patent application Ser. No. 15/082,418, also entitled Controlled-Environment Facility Resident Communication Detection, filed Mar. 28, 2016 and issued as U.S. Pat. No. 9,596,343 on Mar. 14, 2017, and therethrough is a continuation of, and claims benefit of, Ser. No. 14/567,894, also entitled Controlled-Environment Facility Resident Communication Detection, filed Dec. 11, 2014 and issued as U.S. Pat. No. 9,300,791 on Mar. 29, 2016, both of which are hereby incorporated herein by reference.

TECHNICAL FIELD

The present disclosure relates generally to communications by residents of controlled-environment facilities, more particularly to detection of communications by controlled-environment facility residents, and specifically to detection of communications between residents of one or more controlled-environment facilities.

BACKGROUND

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like.

During his or her incarceration, an inmate or other controlled-environment facility resident, may be afforded opportunities to communicate with the outside world. For example, by allowing prisoners to have some contact with friends and family while incarcerated, the justice system aims to facilitate their transition back into society upon release. Traditional forms of contact include telephone calls, and the like. More recently, technological advances have allowed controlled-environment facilities such as jails and prisons to provide other types of visitation, including individual-to-individual videoconferences, and the like. Traditional communication services provide residents of controlled-environment facilities (such as correctional facilities) the ability to place outbound phone calls to non-residents (i.e., a person not incarcerated or otherwise committed to a controlled-environment facility). Additionally, non-residents can typically schedule video visitation with residents (inmates) of the controlled-environment facility. Basically, these and other forms of communication aim to facilitate communication between a resident of a controlled-environment facility and a non-resident.

Problematically, a party to a call, such as a non-resident called by, or who called, a resident of a controlled environment facility may attempt to facilitate communication between the resident and another resident of the same or different controlled environment facility by placing a three-way call, multiparty call, conference call, or the like. Another manner in which a party may attempt to facilitate communication between two residents of (a) controlled environment facility(ies) may employ two telephone lines, wherein the outside party simply places the receivers connected to each of the two lines earpiece to mouthpiece.

Existing systems and methods for controlled-environment facility multiparty communication detection seek to match voiceprints across calls (including calls from different jurisdictions) to see if calls taking place at the same time show the same voiceprint (i.e. if a resident's voice shows up in two concurrent calls, he or she must be participating in some sort of multi-party call). However, false positives may result from failure to differentiate the resident from the outside party. For example, some parties are allowed to speak to multiple inmates, such as an attorney who may have one inmate on hold while conversing with another. In such a case, the existing voice recognition-based system monitoring the residents' controlled-environment facility's (or facilities') communications may detect a three-way call based on the attorney's voice being on two (permitted) concurrent calls. System "spoken" prompts (i.e. recorded prompts) that are included in typical controlled-environment facility resident calls, or which may be invoked by a resident call (i.e. outside telephone system recordings or messages (e.g. generic outgoing voicemail messages, etc.)) may be recognized across multiple concurrent calls, resulting in detection of a same "voice" on each of those calls. Further, limitations in voice modeling to uniquely and/or accurately match individuals may result in false positives, especially given the need to attempt to differentiate multiple speakers from a single recording. That is, in most existing systems, such multiparty call detection using voice recognition is not in real-time. Calls must be recorded and completed, voice modeled, and then compared against a large collection of other such (concurrent) calls. Moreover, existing voice recognition-based multiparty call detection systems are not applicable for all calls. For example, voice modeling only works if a sufficient amount of an individual's talk-time can be identified and extensive sharing of data records across jurisdictions is not practical.

Additionally, over the past several years, a sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often challenged, or unable, to perform investigations with respect to their own inmates.

SUMMARY

The present invention is directed to systems and methods which provide insertion of a modulated signal into audio of a controlled-environment facility resident's side of a call by a controlled-environment communication apparatus, or the like. The same or a different controlled-environment communication apparatus, or the like, may detect the same and/or another modulated signal inserted into the audio of the same and/or another controlled-environment facility resident's side of the call in the audio of another party's side of the call.

In accordance with various embodiments of the present systems and methods, the same or a different controlled-environment communication apparatus, or the like, may determine if more than one modulated signal is present in the other call party's side of the call and alert an authority that more than one controlled-environment facility resident is taking part in the call. In such embodiments, the modulated signal may include resident identification information, controlled-environment facility identification information, controlled-environment facility telephone port information, other location information, and/or the like. In such cases the alert may include the resident(s) identity, identify the controlled-environment facility(ies) involved and/or identify the location of the resident(s) on the call, within the controlled-environment facility(ies).

In some embodiments, the other party may be alerted that the call is from a controlled-environment facility resident in response to detecting the inserted signal in the audio of the other party's side of the call, and if the modulated signal includes resident identification information, the resident may be identified to the other party.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, as noted, various types of controlled-environment facilities are present in today's society, and persons may be voluntary or involuntary residents of such facilities, whether temporarily or permanently. Examples of controlled-environment facilities may include correctional institutions, healthcare facilities, restricted living quarters, schools, and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as prisoners, inmates, arrestees, detainees, or the like. It should be understood, however, that the systems and methods described herein may be similarly applicable to other types of controlled-environment facilities and their respective residents (e.g., a hospital and its patients, a school dormitory and its students, etc.).

As noted, the present systems and methods relate generally to communications by residents of controlled-environment facilities, more particularly to detection of communications by controlled-environment facility residents, and specifically to detection of communications between residents of one or more controlled-environment facilities. For example, in accordance with embodiments of the present systems and methods for definitive controlled-environment facility resident to resident communication detection, a controlled-environment communication apparatus, or the like may insert a modulated signal into audio of a controlled-environment facility resident's side of a call. The same or a different controlled-environment communication apparatus, or the like, may detect the same and/or another modulated signal inserted into the audio of the same and/or another controlled-environment facility resident's side of the call in the audio of another party's side of the call. The same or a different controlled-environment communication apparatus, or the like, may determine if more than one modulated signal is present in the other call party's side of the call and alert an authority, such as a designated member(s) of the controlled-environment facility's(ies') staff, law enforcement personnel, an automated system to determine the propriety of the call, or the like, that more than one controlled-environment facility resident is taking part in the call.

For example, in accordance with embodiments of the present systems and methods for definitive controlled-environment facility resident-to-controlled-environment facility resident communication detection, detection of three-way call events may employ "listening" to calls. To this end, a signal is added to the resident audio side of the call marking the call as a resident call. Modulation of the signal can be such as to locate it in a frequency domain less prone to being heard, rendering it more or less inaudible. Further, modulation of the signal can be such as to embed data, which can be used to identify the resident, the controlled-environment facility, and/or a phone port from which the resident's side of the call originates. Signal detection on the other side of the call is employed, in accordance with embodiments of the present systems and methods, to find the embedded signal, whether the party on the other side of the call is a non-resident (i.e., a person not incarcerated or otherwise committed to a controlled-environment facility), another resident of the controlled-environment facility, or a resident of another controlled-environment facility. With the above, once a second "resident signal" is detected on the other party's side of the audio, it will be known, in accordance with embodiments of the present systems and methods, that the other party has added another leg to the call and that the third leg is to another inmate. Because of the aforementioned ability to embed data into the signal, it is possible to know who the inmate is or at least where the added resident is located. Because the detection is carried out during the call, it is possible to take action as the result of the detection, such as to mark a Call Detail Record (CDR), append a recording of the call to the CDR, terminate the call, send an alert so that authorized staff can listen to the call, or the like. Because the signal is an intentional injection into the resident's audio, it will be definitive proof of a resident-to-resident communication, and in an incarceration environment, definitive proof of an inmate-to-inmate communication, which may be legally admissible in a court of law with a relatively easy to establish foundation. Also, because the signal is intentional, it is possible to filter it out so that even if it is in the audible spectrum that it can be attenuated and/or removed so that it does not impact the resident, even if the other call party might hear it.

Figure 1:
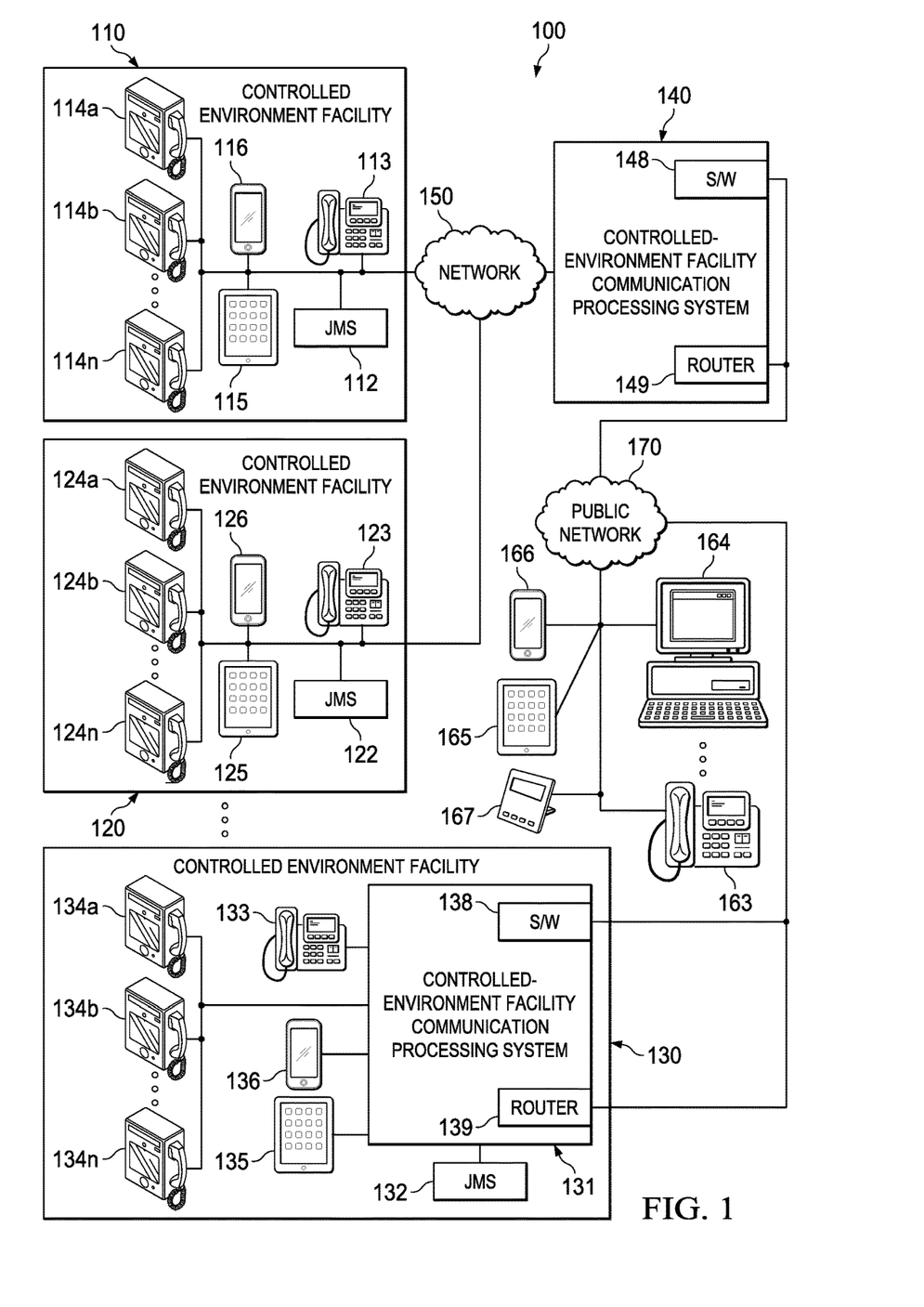
FIG. 1 is a diagrammatic illustration of an example communications environment, wherein an example embodiment of the present systems and methods for detection of communication from one or more residents of one or more controlled environment facilities may be deployed, according to some embodiments.

FIG. 1 is a diagrammatic illustration of example communications environment 100, wherein an example embodiment of the present systems and methods for detection of communication from one or more residents of one or more controlled environment facilities 110, 120, 130 etc. may be deployed, according to some embodiments. Therein, external, centralized communication processing system 140, onsite communication processing system 131, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated a communication processing system (140) may be centrally or remotely located, in whole or in part, with respect to one or more controlled-environment facilities (110, 120, etc.), may be connected to such facilities via a public or private network (150) and may provide communication services to such multiple controlled-environment facilities. More generally, however, it should be noted that communication systems 131, 140, etc. may assume a variety of forms, and may be configured to serve a variety of facilities and/or users, whether within or outside of a controlled-environment facility.

In some implementations, wherein the controlled-environment communication system (131) is located within the controlled-environment facility (130), it may have direct access to an Administration Management System (AMS) or Jail Management System (JMS) 132 for garnering information used in accordance with various embodiments of the present systems and methods. In other embodiments, where the (central) controlled-environment facility communication system (140) is located remotely with respect to the controlled-environment facility (110, 120, etc.), access to AMS or JMS 112, 122, etc. may be obtained via a computer network such as, for example, network 150, for gathering information used in accordance with various embodiments of the present systems and methods.

Residents may use more-or-less conventional telephones 113, 123, 133, or the like to access certain communication services, under control of respective communication processing system 131, 140, etc. Additionally or alternatively, in some facilities a resident may use a video visitation device 114a through 114n, 124a through 124n, 134a through 134n, or the like, to place voice calls, as well as for video visitation, under control of respective communication processing system 131, 140, etc. Such a video visitation device may be referred to as an Intelligent Facility Device (IFD) (114, 124, 134), which may be a video phone particularly adapted for use in a controlled-environment facility, but which may be used to place voice calls, as well. Alternatively or additionally, IFDs may take the form of, or be used as, a voice phone that may have a touchscreen interface. Generally speaking, IFDs may be disposed in a visitation room, in a pod, as part of a kiosk, etc. Additionally or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, mss, IFDs, or other similar devices, as well as phones 113, 123, 133, etc. have communications capabilities, to enable a party to participate in telephone calls, video visitation sessions (video calls), or the like with other call parties, such as non-residents other residents with other parts of the same controlled-environment facility, residents of other controlled-environment facilities, etc., under control of respective communication processing system 131, 140, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFD may be configured to capture a video image of a resident to be transmitted to a non-resident using the camera, and to display a video image of the non-resident to the resident using the display. IFD may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are illustrated in FIG. 1 as hardened, wall-mounted devices, IFDs may also take the form of a kiosk-type terminal or the like. In some cases, IFD may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self service" tasks such as setting up doctor appointments, scheduling visitation, viewing schedules, and checking the status of his or her case. The intelligent facility device may include an RFID or biometric reader, or the like to enable precise identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods, for detecting calls from other residents, as discussed in greater detail below.

As noted, IIDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, in a correctional institution, jail, or the like, such an IID may be "stripped-down," particularly from the standpoint of what applications programs (apps) are provided or allowed on the IID, and/or connectivity afforded the IID. By way of example, such an IRD may employ an operating system kernel based upon an open source platform such as the CyanogenMod ANDROID™—based operating system, which may be rebuilt for use in such a tablet computing device in a controlled-environment facility. For example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRD might include apps of particular interest to residents of the controlled-environment facility. For example, IID provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmates transition. For example, the IID may be used to communicate with a future employer, or the like. As such, IIDs may be sponsored, or otherwise subsidized by organizations or companies, assisting with the transition of inmates into society. As noted, in accordance with embodiments of the present systems and methods, IIDs may be used to communicate with others, such as through phone calls, video calls, or the like. To this end such IIDs (115, 125, 135, 116, 126, 136, etc.) may include a preinstalled, non-removable app to facilitate implementation of embodiments of the present systems and methods, and/or to carry out all or certain aspects of embodiments of the present systems and methods, for detecting calls from other residents, as discussed in greater detail below.

To access communications services, a resident may initiate telephone services by lifting the receiver on telephone 113, 123, 133, etc. or IFD 114, 124, 134, etc. and/or otherwise initiating a call, such as by launching an applications program (app) on IRD 115, 125, 135, 116, 126, 136, etc. At which time, the resident may be prompted to provide a personal identification number (PIN), other identifying information or biometrics. An interactive voice response (IVR) unit (not shown, but which may be integrated into communications processing system 131 and/or 140, etc.) may generate and play a prompt or other messages to the resident. Under the control of communication processing system 131 and/or 140, etc. the device may be capable of connecting to a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Switch 148, 138, etc. in respective communication processing system 131, 140, etc. may be used to connect calls across a PSTN (i.e. network 170), such as calls from controlled-environment facility telephone 113, 123 or 133 and non-resident telephone 163. Router 149, 139, etc., media gateway functionality, or the like of respective communication system 131, 140, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally or alternatively the non-resident devices may be disposed in a visitation area of controlled-environment facility 110, 120, 130, etc., which may be within, adjacent to, or remote with respect controlled-environment facility 110, 120, 130, etc., itself.

In accordance with various embodiments of the present systems and methods, a controlled-environment communication apparatus that carries out detection of a call from a resident of a controlled-environment facility and/or that may detect a call involves two or more residents of one or more controlled-environment facilities may take the form of central and/or onsite controlled-environment facility communication management system 140 and/or 131, respectively. Additionally, or alternatively, as mentioned above, intelligent controlled-environment facility communication devices, such as IFDs 114, 124, 134, etc. and/or residents IIDs 115, 125, 135, 116, 126, 136, etc. may be employed to facilitate implementation of embodiments of the present systems and methods, and/or to carry out all or certain aspects of embodiments of the present systems and methods, for detecting calls from other residents. Computer-based IFDs 114, 124, 134, etc. may include programming and/or hardware to implement embodiments of the present systems and methods. This programming may take the form of stored program instructions, programmed firmware, or the like, while hardware might take the form of an Application Specific Integrated Circuit (ASIC), or the like, to carry out all or certain aspects of embodiments of the present systems and methods. Regardless, the controlled-environment communication apparatus(es) insert(s) a modulated signal into the audio of a controlled-environment facility resident's side of a call placed employing the controlled-environment communication apparatus. For example, controlled-environment facility communication processing system 131 and/or 140, etc. may insert the modulated signal after the signal originates from controlled-environment facility phone 113, 123, 133, etc. IFD 114, 124, 134, etc., IRD 115, 125, 135, 116, 126, 136, or the like, before it reaches the other call party's equipment 163, 164, 165, 166. In another example, IFDs 114, 124, 134, etc. and/or resident IRDs 115, 125, 135, 116, 126, 136, etc. may insert the modulated signal as apart of origination of the resident's audio output. The controlled-environment communication apparatus(es) may, in various embodiments, modulate the signal to include resident identification information, controlled-environment facility identification information, controlled-environment facility telephone port information, and/or the like.

The modulated signal, and/or one or more other modulated signal(s) inserted into the audio of one or more other controlled-environment facility resident side(s) of another, or other, call(s) is detected in the audio of another party's side of the original call, by the controlled-environment communication apparatus(es). For example, controlled-environment facility communication processing system 131 and/or 140, etc. may detect any modulated signal(s) (or additional modulated signals) in an incoming audio signal (such as from a non-resident, or another resident of the same or different controlled-environment facility, taking part in the call), in real-time, as the audio stream is passed on to controlled-environment facility phone 113, 123, 133, etc., IFD 114, 124, 134, etc., IRD 115, 125, 135, 116, 126, 136, or the like. In another example, IFDs 114, 124, 134, etc. and/or resident IIDs 115, 125, 135, 116, 126, 136, etc. may detect any (additional) modulated signal(s) in an incoming audio signal (such as from a non-resident, or another resident of the same or different controlled-environment facility, taking part in the call), in real-time, as the audio stream is received.

When detection is a goal, or in particular the only goal, the controlled-environment communication apparatus(es) may alert the other called party that the person they are speaking to is a resident of a controlled environment facility, and if identification information is included in the modulated signal, the resident may be identified to the other party. For example, in a correctional facility embodiment, a judge, prosecuting attorney, or similar non-resident may desire to screen calls in addition to use of typical caller ID or the like. Thus, in accordance with such embodiments, informational display device 167, associated with the non-resident's communication equipment (e.g. phone 163), or the display of non-resident computer 164, non-resident tablet computing device 165, non-resident smartphone/media player 166, or the like, may display the alert and/or identification of the resident(s) on the call. Such an alert and identification of the resident may not be an available feature through the mere use of traditional caller ID, or the like (i.e. existing caller ID might only identify the facility, if that, and not the actual call party). Such display or alert, may be accomplished by informational display device 167 itself detecting a modulated signal(s) in an incoming audio stream, in real-time, as the audio stream is received. Also, or alternatively, the controlled-environment communication apparatus(es) may alert an authority, such as a designated member(s) of the controlled-environment facility's(ies') staff, law enforcement personnel, an automated system to determine the propriety of the call (which may be provided by controlled-environment facility communication processing system 131 and/or 140, etc., JMS 112, 122, 132, etc.), or the like, that the controlled-environment facility resident is taking part in the call, including, in accordance with some embodiments, the identity and/or location of the resident.

In multiparty detection embodiments, the controlled-environment communication apparatus(es) may, in response to detecting more than one modulated signal in the audio of the other call party, alert an authority that more than one controlled-environment facility resident is taking part in a call. This alert may identify to the authority each resident taking part in the call, the facility of each resident taking part in the call, and a location within a respective controlled environment facility from which each resident is calling (e.g. based on controlled-environment facility telephone port information, GPS information provided by an IRD, or the like), if such information is included in the modulated signal, as discussed above. The alert and/or information may be issued by one of controlled-environment facility communication processing system 131 and/or 140, etc., IFDs 114, 124, 134, etc., IRD 115, 125, 135, 116, 126, 136, etc., in response to detection of a signal (one or more additional signal(s)) by any one of controlled-environment facility communication processing system 131 and/or 140, etc. IFDs 114, 124, 134, etc., IRD 115, 125, 135, 116, 126, 136, etc., in the manner discussed above.

Figure 2:
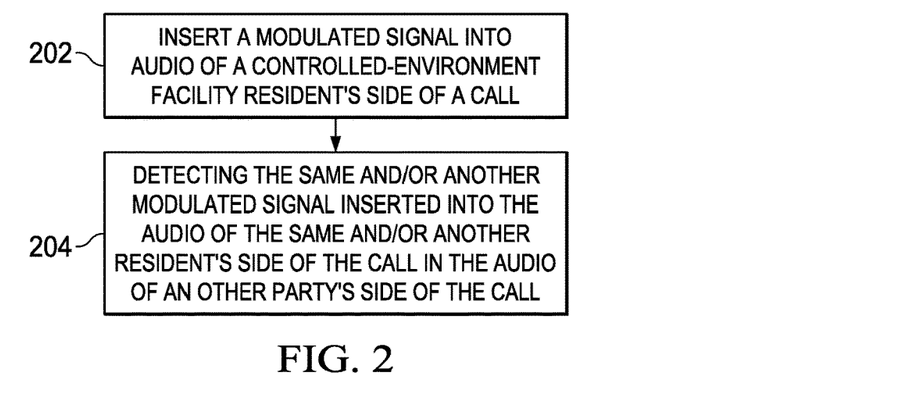
FIG. 2 is a flowchart of an example process for detection of a call from a resident of a controlled-environment facility, in accordance with some implementations.

FIG. 2 is a flowchart of example process 200 for detection of a call from a resident of a controlled-environment facility, in accordance with some implementations. Therein, a modulated signal is inserted into the audio of a controlled-environment facility resident's side of a call at 202. At 204 the modulated signal is detected in the audio of another party's side of the call, such as a non-resident, another resident of the same controlled environment facility or a resident of another controlled-environment facility.

In some implementations, it may be desired, such as by a non-resident party to detect calls from residents of a controlled-environment facility, particularly to detect such calls in-band (in contrast to the use of out-of-band caller ID). For example, in a correctional facility implementation, a judge, prosecuting attorney, or similar non-resident may desire to screen calls in addition to use of general caller ID or the like. Thus in accordance with such implementations, in response to detecting the inserted signal at 204, the other party may be alerted that the call is from a controlled-environment facility resident. Also, in such implementations, if the modulated signal includes resident identification information, the resident may be identified to the other party, which may not be an available feature through the mere use of caller ID, or the like.

Alternatively, in multiparty call detection implementations a determination may be made as to whether more than one modulated signal is detected at 204 (i.e. are present) in the other call party's side of the call. If so, an authority, such as a designated member(s) of the controlled-environment facility's(ies') staff, law enforcement personnel, an automated system to determine the propriety of the call (which may be a provided by controlled-environment facility communication processing system 131 and/or 140, etc., JMS 112, 122, 132, etc.), or the like, that more than one controlled-environment facility resident is taking part in the call. If modulated signal(s) include(s) resident identification information, the resident(s) may be identified to the authority, and/or if the modulated signal(s) include(s) controlled-environment facility identification information, the facility (ies) may also be identified to the authority. Further in such implementations, if the modulated signal may include controlled-environment facility telephone port information, GPS information provided by an IRD, or the like, the authority may be alerted to the actual location within the controlled environment facility from which the resident is calling, in real time.

Figure 3:
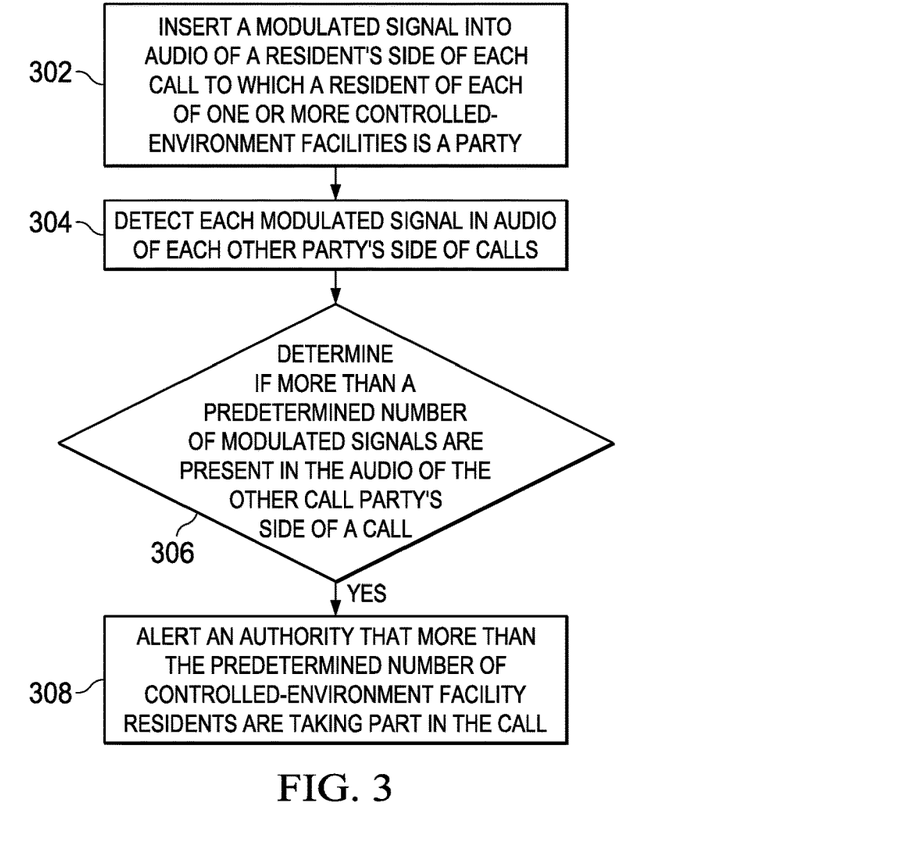
FIG. 3 is a flowchart of an example process for detection of a call between two or more residents of one or more controlled-environment facilities, in accordance with some implementations.

Further outlining such multiparty call detection implementations, FIG. 3 is a flowchart of example process 300 for detection of a call involving two or more residents of one or more controlled-environment facilities, including investigative processes in accordance with some implementations. Therein, a modulated signal is inserted into the audio of a controlled-environment facility resident's side of each call to which a resident of one or more controlled-environment facilities is a party, at 302. In various embodiments, the modulated signal is inserted, regardless of whether the call originated from the resident or not. For example, the modulated signal may be inserted upon a resident joining a call initiated by a non-resident. This modulated signal may be inaudible, such as due to its frequency domain or band. Also, as noted above, the modulated signal may include resident identification information, controlled-environment facility identification information, controlled-environment facility telephone port information, GPS information provided by an IRD, and/or the like.

At 304 each modulated signal inserted into the audio of each call to which a resident of (a) controlled-environment facility(ies) is a party is detected in the audio of the other call party's side of the call. A determination is made at 306 whether more than a predetermined number of modulated signals are present in audio of any other call party's side of a call. For example, in a call between a resident and non-resident there should only be one modulated signal present. In contrast, in a call between two residents of the same or different controlled-environment facility(ies), there may be two modulated signals present, such as a modulated signal inserted by each residents' controlled environment facility communication apparatus(es), as discussed above.

At 308, in response to a determination that more than a predetermined number of modulated signals are present in the audio of any other call party's side of the call, at 306, an authority may be alerted, in real time, that more than the predetermined number of controlled-environment facility residents are taking part in the call. As also discussed above, this alert may include identification of the residents taking part in the call and/or identification of the residents' controlled-environment facilities, if resident identification information, and/or controlled-environment facility identification information is included in the modulated signal. The alert may also include a specific location of one or more of the residents, if the modulated signal includes location information such as the controlled-environment facility telephone port the resident's side of the call is originating from, GPS information provided by an IRD, or the like.

Hence, the present systems and methods provide definitive detection of a controlled-environment facility resident call, resulting from injection of a known, easily identifiable marker. Also, in accordance with various embodiments of the present systems and methods definitive identification, resulting from an ability to modulate the injected signal at the source of the resident's call to include identifying details and/or the source of the call. Still, in accordance with such embodiments detection is independent of identification, resulting from the ability for such embedded signals to be detectable, even if the modulated signal may be difficult to decode (e.g. due to signal corruption, etc.). Hence, even calls where an outside part has employed two lines and placed the receivers connected to each of the two lines earpiece to mouthpiece, may be detected. Further, embodiments of the present systems and methods may provide real time detection and identification, in that the present systems and methods provide easily scalable detection while calls are in progress. Thereby, enabling additional real time features such as, for example, issuance of automatic alerts to administrative and/or investigative staff of the existence of resident-to-resident inmate calls. As a particular example in correctional facility context, silent alarm/notification of a facility administration personnel, law enforcement personnel, or the like, based on inmate-to-inmate communication detection might allow investigators to monitor a call, in real-time. Other real time features might provide automatic system responses to terminate the call or warn the participants. Such features might be a configurable option, and/or scalable (e.g. beginning with a warning and then moving to disconnection after a period of (configurable) time.

Figure 4:
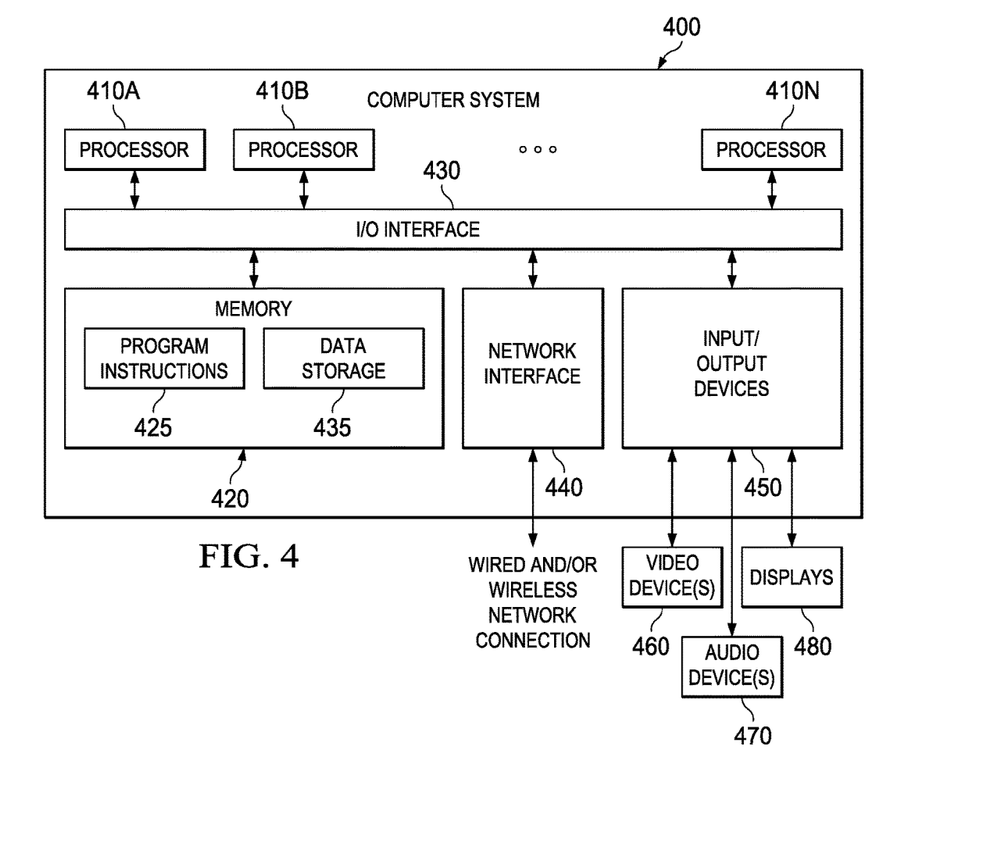
FIG. 4 is a block diagram of a computer system, device, station, or terminal configured to implement various techniques disclosed herein, according to some embodiments.

Embodiments of the present systems and methods for controlled-environment facility resident communication detection, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example processes 200 and/or 300 described above with respect to FIGS. 1 through 3, and/or a computer system such as computer system 400 may be used as, or as part of, one or more of controlled environment facility communication processing systems 131, 140, etc., JMSs 112, 122, 132, etc., IFDs, 114, 124, 134, etc. IRDs 115, 116, 125, 126, 135, 136, non-resident computer 164, non-resident table device 165, non-resident smartphone/media player 166 and/or the like. In various embodiments two or more of these computer systems may be configured to communicate with each other in any suitable way, such as, for example, via a network (e.g., in FIG. 1, via networks 150 and/or 170).

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident communication detection method comprising:
    inserting, by a controlled-environment communication apparatus, a modulated signal into audio of a controlled-environment facility residents' sides of calls; and
    detecting, by the same or a different controlled-environment communication apparatus, the same and/or another modulated signal inserted into the audio of the same and/or another controlled-environment facility resident's side of a call in the audio of another party's side of the call.

2. The method of claim 1, further comprising, alerting, by the same or a different controlled-environment communication apparatus, an authority that a controlled-environment facility resident is taking part in the call.

3. The method of claim 2, further comprising the modulated signal including resident identification information, and identifying the resident to the authority.

4. The method of claim 2, further comprising the modulated signal including controlled-environment facility identification information, and identifying the facility to the authority.

5. The method of claim 2, wherein the modulated signal includes controlled-environment communication apparatus information for the controlled-environment communication apparatus inserting the modulated signal into audio of the controlled-environment facility resident's side of a call, and alerting the authority includes identifying a location in the controlled-environment facility the resident is calling from.

6. The method of claim 5, wherein the alert is provided in real time.

7. The method of claim 5, wherein the controlled-environment communication apparatus information of the controlled-environment communication apparatus inserting the modulated signal comprises controlled-environment facility telephone port information associated with the controlled-environment communication apparatus inserting the modulated signal.

8. The method of claim 5, wherein the controlled-environment communication apparatus information of the controlled-environment communication apparatus inserting the modulated signal comprises global positioning system information provided by the controlled-environment communication apparatus inserting the modulated signal.

9. The method of claim 1, further comprising, determining, by the same or a different controlled-environment communication apparatus, if more than one modulated signal is present in the other call party's side of the call.

10. The method of claim 9, further comprising, alerting, by the same or a different controlled-environment communication apparatus, an authority that more than one controlled-environment facility resident is taking part in the call.

11. The method of claim 1, further comprising, alerting the other party that the call is from a controlled-environment facility resident in response to detecting the inserted signal in the audio of another party's side of the call.

12. The method of claim 1, wherein the modulated signal includes resident identification information, and the method of claim 1 further comprises identifying the resident to the other party.

13. A controlled-environment facility resident communication detection system comprising:
    a controlled-environment communication apparatus configured to insert a modulated signal into audio of a controlled-environment facility resident's side of a call; and
    an informational display device configured to detect the modulated signal inserted into the audio of the controlled-environment facility resident's side of the call in an incoming audio stream, as the audio stream is received, and configured to alert a called party that the call is from a controlled-environment facility and/or controlled-environment facility resident in response to the informational display device detecting the inserted signal in the incoming audio stream, as the audio stream is received.

14. The system of claim 13 wherein the informational display device is further configured to alert an authority that a controlled-environment facility resident is taking part in the call.

15. The system of claim 13, wherein the informational display device is associated with the called party's non-resident communication equipment, or is a non-resident computer, non-resident tablet computing device, non-resident smartphone, or a non-resident media player.

16. The system of claim 13, wherein the modulated signal includes identification information.

17. The system of claim 16, wherein the identification information included in the modulated signal includes controlled-environment facility identification information, and the alert identifies the controlled-environment facility on the informational display device.

18. The system of claim 16, wherein the identification information included in the modulated signal includes resident identification information, and the alert identifies the controlled-environment facility resident on the informational display device.

19. A controlled-environment facility resident communication detection method comprising:
    inserting, by a controlled-environment communication apparatus, a modulated signal into audio of a controlled-environment facility resident's side of a call;
    detecting, by the same or a different controlled-environment communication apparatus, the same and/or another modulated signal inserted into the audio of the same and/or another controlled-environment facility resident's side of the call in the audio of another party's side of the call; and
    providing, in response to detecting the same and/or another modulated signal inserted into the audio of the same and/or the other controlled-environment facility resident's side of the call in the audio of another party's side of the call, an alert to an automated system to determine propriety of the call.

20. The method of claim 19, wherein the automated system comprises a controlled-environment facility management system.

21. The method of claim 19, wherein the automated system comprises a controlled-environment facility communication processing system.

22. The method of claim 19, wherein the modulated signal includes controlled-environment facility resident identification information and providing the alert to the automated system includes identifying the controlled-environment facility resident for determination of the propriety of the call.

* * * * *